United States Patent [19]

Malinowski

[11] Patent Number: 4,937,774

[45] Date of Patent: Jun. 26, 1990

[54] EAST IMAGE PROCESSING ACCELERATOR FOR REAL TIME IMAGE PROCESSING APPLICATIONS

[75] Inventor: Christopher W. Malinowski, Melbourne Beach, Fla.

[73] Assignee: Harris Corporation, Melbourne, Fla.

[21] Appl. No.: 266,812

[22] Filed: Nov. 3, 1988

[51] Int. Cl.$^5$ .............................................. G06F 15/31
[52] U.S. Cl. ............................ 364/724.12; 364/728.01
[58] Field of Search ..................... 364/724.12, 728.02; 382/42

[56] References Cited

U.S. PATENT DOCUMENTS

| | | | |
|---|---|---|---|
| 3,872,290 | 3/1975 | Crooke et al. | 364/724.12 |
| 3,980,873 | 9/1976 | Mattei | 364/724.12 |
| 4,720,871 | 1/1988 | Chambers | 364/728.01 X |

OTHER PUBLICATIONS

Baier et al, "Two-Dimensional Convolution Processor", IBM Tech. Discl. Bull. vol. 26, No. 9, Feb. 1984, pp. 4807-4808.

"LSI Hardware Implements Signal Processing Algorithms" Finn, Mar. 1980, Computer Design.

"*Board Power Chases Mystique, Expense from Image Processing*", Leonard, Electronic Design, Sep. 17, 1987 pp. 93-102.

"Frame-Grabber Boards Acquire and Process Images in Real Time", Preston et al, EDN, Sep. 18, 1986, pp. 273-278.

"Board-Level Image Processors Enter Desktop Arena", Williams, Computer Design, Jun. 1, 1986, pp. 25-30.

"An Economical, Powerful System for Video-Enhanced Microscopy", Maranda, American Laboratory, Apr. 1987.

*Primary Examiner*—Gary V. Harkcom
*Assistant Examiner*—Tan V. Mai
*Attorney, Agent, or Firm*—Barnes & Thornburg

[57] ABSTRACT

A modular matrix processor which is capable of configuration as a stand alone symmetrical kernel convolutor or one of plural cascaded asymmetrical kernel convolutors. The module includes coefficient registers and associated multipliers to multiply sequential pixels or words by an appropriate coefficient. A summer, with appropriate input delays, sums the products and provides them to a plurality of FIFO (first in - first out) for storing the sums per row. An adder adds the contents of the summer, FIFO's and cascaded inputs to provide a convolution output $P_c$. Plural frames may be processed using the pixel input, coefficient input and cascade inputs. Plural modules may be used per row to increase the kernel size as well as the row capacity of the FIFO's.

26 Claims, 8 Drawing Sheets

EAST IMAGE PROCESSING ACCELERATOR FOR REAL TIME IMAGE PROCESSING APPLICATIONS

BACKGROUND AND SUMMARY OF THE INVENTION

The present invention relates generally to matrix processors and more specifically to matrix processors of images.

Modern image processing frequently requires that a massive number of repetitive computations be performed on a single array of picture elements (pixels) before they are displayed. They purpose of these computations is to enhance the contents of a single picture frame, or modify them to suit a specific image analysis objective. The two most common classes of pixel operations are the pixel-point operations and pixel-group operations. Pixel-point operations are considerably less computation-intensive than the pixel-group operations; they usually call for simple arithmetic or logic operations to be performed on each pixel of the frame. On the other hand, pixel-group operations usually involve a square or rectangular window (convolution kernel) of neighboring pixels upon which a set of arithmetic operations is to be performed. This set of operations is repeated for each pixel of the frame except for the border pixels.

The value of the pixel usually indicates the intensity of a specific RGB video component for chromatic applications, or a gray scale value of monochromatic applications (such as radar signal processing or image recognition).

It is the pixel-group operations that have, to date, established the limits of real-time image processing speeds. The most common pixel-group operation in image processing is a so-called spatial convolution, i.e. a process of multiplying selected neighboring pixels by a set of values called a convolution coefficient kernel followed by the summation of the results. For instance a typical application, a set of, say, 9 pixels is arranged as a $3 \times 3$ matrix:

$$
\begin{array}{ccc}
P(x-1,y+1) & P(x,y+1) & P(x+1,y+1) \\
P(x-1,y) & P(x,y) & P(x+1,y) \\
P(x-1,y-1) & P(x,y-1) & P(x+1,y-1)
\end{array}
$$

where x and y indicate pixel's coordinates in the frame array. Each pixel's K-bit value (where K usually lies in the 6–12 bit range) of such a $3 \times 3$ array is then multiplied respectively by an M-bit coefficient value (where M can be typically 6–16 bit value) from the $3 \times 3$ coefficient kernel:

$$
\begin{array}{ccc}
A & B & C \\
D & E & F \\
G & H & I
\end{array}
$$

The matrix above is called the convolution kernel, and each of its elements is referred to as convolution coefficient. Finally, after all 9 multiplications are completed, their results are then summed to yield the new value of the pixel in the location x,y:

$$NEWP(x,y) = P(x-1,y+1)*A + P(x,y+1)*B +$$

-continued
$$P(x+1,y+1)*C + P(x-1,y)*D + P(x,y)*E +$$
$$P(x+1,y)*F + P(x-1,y-1)*G + P(x,y-1)*H +$$
$$P(x+1,y-1)*I$$

The new value of the pixel NEWP(x,y) usually corresponds to the modified valued of its amplitude (gray scale). The entire process described above is called "2-D spatial filtration" or "2-D spacial convolution" and corresponds to a discrete two-dimensional filtration of the image in the time domain. Depending on the set of values A ... I picked for the convolution kernel, a number of image processing functions can be accomplished. In particular, operations such as image smoothing, edge detection or extraction, or contrast enhancement can be accomplished. If all kernel coefficients except for the middle one (E) are picked equal to each other, or all nine of them are equal, the kernel is referred to as symmetrical. This is the most common form of the kernels used in the modern image processing. If three or more coefficients in the kernel differ from each other the kernel is called asymmetrical.

Although the use of larger kernels, such as $5 \times 5$, $7 \times 7$ or even $15 \times 15$, is even more desirable (since it increases the bandwidth of convolution), the amount of computations involved in convolution with such large kernels is often prohibitive for most applications. Since industry standard frame array sizes vary from $256 \times 256$ pixels to $4096 \times 4096$, the number of multiplications and additions which have to be performed for a single frame convolution varies from approximately 600,000 to almost 160 million per frame. Consequently, if the frames are to be convolved in real time (i.e. processed at the same rate, or faster, than they are acquired and digitized), the total frame convolution time puts an obvious restriction on the image acquisition time. Thus, for example, if the industry standard medium resolution image of $512 \times 512$ is to be acquired and convolved using $3 \times 3$ kernel, almost 2.5 million multiplications and additions will have to be performed. If a single eight-bit multiply/accumulate operation is assumed to require 50 nanoseconds using off-the-shelf multiplier-accumulater (MAC), the total amount of time required to complete a single frame convolution will be 0.125 seconds. This, in turn, would imply that the maximum frame repetition rate would be limited to 8 Hz, a rate too slow for most industrial and commercial applications typically requiring at least a 30 Hz frame repetition rate.

Consequently, most modern image processors do not offer real-time $3 \times 3$ convolution capabilities. On the other hand, in most industrial and military applications, the frame repetition rates vary from 30 Hz (interlaced NTSC standard) to as fast as 400 Hz. This implies that for $512 \times 512$ pixel arrays total frame convolution times in the millisecond range are needed. In practice, such convolution speeds have rarely been accomplished and only in board-level designs. ECl-based designs can meet such requirements.

Figure 1:
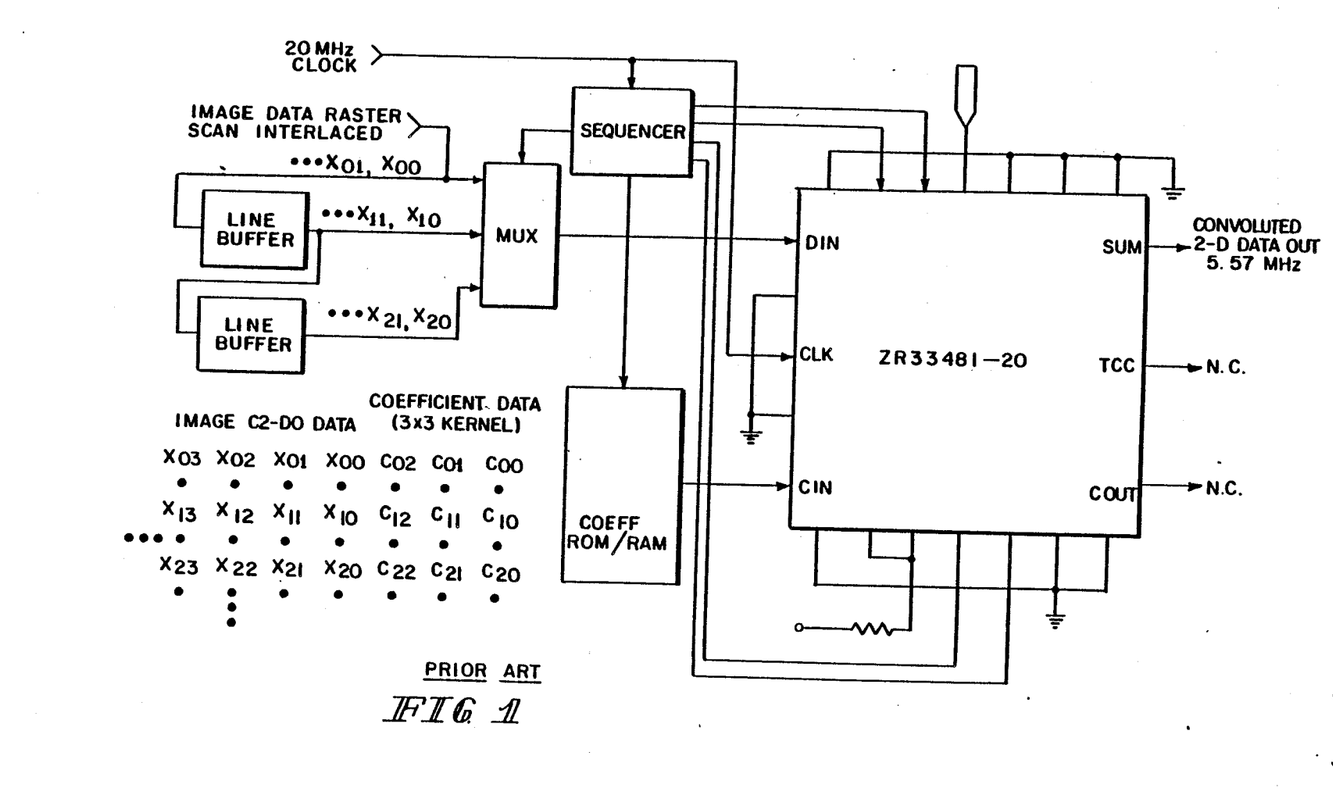
FIG. 1 is a diagram of a real-time image processing convolver of the prior art.

Image processing chips which claim to perform near real-time convolution require large amounts of external circuitry to resequence the pixels before they are sampled by the processor. An example of this is shown in FIG. 1. This diagram illustrates the way ZORAN's ZR33481-20 DFP is used to accomplish $3 \times 3$ convolution. Notice that the pixels must be heavily buffered externally while a Sequencer controls the order that the DFP receives the 'shuffled' image data.

Thus, it is an object of the present invention to provide a matrix processor capable of real-time processing.

Another object of the present invention is to provide a matrix processor which can do real-time convolution of $3\times3$, $5\times5$ and other kernels.

Still a further object of the present invention is to provide an image processor capable of doing kernel convolutions of matrix from $256\times256$ to multiples of that array.

An even further object of the present invention is to provide a matrix processing module which may be configured to do real-time processing of symmetrical and asymmetrical matrices operations.

A still further object of the present invention is to provide a image processor architecture which is capable of doing real-time kernel convolution as well as other image enhancing or processing operations.

A still even further object of the present invention is to provide a real-time image processing chip without the need for external buffering and data shuffling.

These and other objects are achieved by a matrix processor module, including data inputs receiving in sequence P words from a matrix, coefficient inputs receiving coefficients for matrix multiplication, cascade inputs for receiving summing information when the module is cascaded with other modules and an output. The module includes a plurality of multipliers connected in parallel to the data inputs either directly or through an ALU as well as being connected to a respective coefficient input for producing products PC. A summer is selectively connected to the multipliers by selected delays for providing a sum of the inputs received from the multipliers. A plurality of FIFO storage elements are selectively connected to the summer, the cascade input and one of the multipliers for storing M words. An adder is connected to the summer and the FIFO storage for adding inputs from the summer and the FIFO storage to provide an output Pc. A control is connected to the summer and the FIFO storage for controlling the configuration of the module to a first configuration which performs symmetrical kernel convolution or a second configuration which is capable of performing asymmetrical kernel convolution.

In the symmetrical kernel operation, only two coefficients are needed one being C1 which is the coefficient for the kernel except for the center coefficient and C2 being the center coefficient. Irrespective of the size of the kernel $Q\times R$, only two multipliers and two coefficients are needed. The first multiplier multiplies the common coefficient C1 times the incoming word P and provides it to the summer, which is configured as a shifting accumulator of Q products representing the number of products in a row, wherein the accumulator value is $P_iC_1+P_{i-1}C_1 \ldots +P_{i-Q+1}C_1$. The summer is converted to a shifting accumulator by a time delay connecting the output of the summer to a input and delaying it one cycle and a second delay connected to the input of the summer from the multiplier with a time delay of Q cycles to be subtracted from the value of the summer. The output of the summer is connected to R-1 FIFO storages, each of which stores a respective row of sums and has a capacity of M or the number of words in the row of the matrix to which the kernel convolutions is being performed. The second multiplier multiplies the input P times the difference of the two coefficients to produce the product $P(C_2-C_1)$ and stores that in an additional $R^{th}$ FIFO storage element. The addition of the R FIFO storage element with the current output of the summer at the adder produces the kernel convolution PC at the output. The configuration control uses a plurality of multiplexers to select the appropriate routing of the information. For example, for a $3\times3$ kernel convolution of a $256\times256$ matrix, there will be three FIFOs one for the product of the difference of two coefficients and P word and two for the product of the common coefficient and P word and all of the FIFOs having a capacity of 256 words. The summer would include 3 products and the time delay between the output and the input would be 3 cycles.

For asymmetrical kernel convolution, the matrix processor module would be configured to have Q multipliers each connected in parallel to the input to multiply the input word by respective coefficients $C_1$ through $C_Q$. The outputs of the multipliers would be connected to the summer by varying degrees of FIFO delay increasing one delay per multiplier. A single FIFO is used and connected to the cascade input to store an input from a preceding module, wherein the FIFO storage has a storage capacity of M. The adder adds the output of the FIFO with the output of the summer to produce a sum for that module. In a general scheme there would be a matrix processor module for each row of the kernel. For example, for a $3\times3$ kernel of a $256\times256$ matrix, the FIFO storage element would have a capacity of 256 products and there would be three multipliers receiving three coefficients for the respective row and there would be a three cascaded matrix processor modules.

For a $5\times5$ matrix, there would be five multipliers for the five words in a row and five modules representing the five rows. Alternatively, a three multiplier module maybe used, wherein each row would include two three multiplier modules having their inputs connected in parallel to the input and arranged in columns. The cascade input of any module would be connected to the module of the preceding row within its column. A final adder would be provided to add the outputs of the two columns. The unused multipliers, for example one, would have a coefficient of zero. The time delays of the multiplier input to the summer would be 012 for a $3\times3$ and 01234 for a $5\times5$. Since the outputs are cascaded through the FIFOs, an appropriate 256 delay would be provided per row to the next row.

If the matrix to be kernel convoluted are multiples of a $256\times256$ matrix, each of the rows would include more than one module connected in cascade wherein the input coefficients of the extra modules per row are zero. Thus, for a $1024\times1024$ matrix, each row would include two matrix processor modules, wherein the second module would have zero coefficients and the products from the first module would be stored in the 256 FIFO of the second module such that the output of the second module would be a 1024 cycle delay to be cascaded into the first module of the next row. Each of the rows, except the last row would have the multiple modules.

Other objects, advantages and novel features of the present invention will become apparent from the following detailed description of the invention when considered in conjunction with the accompanying drawings.

DETAILED DESCRIPTION OF THE DRAWINGS

Figure 2:
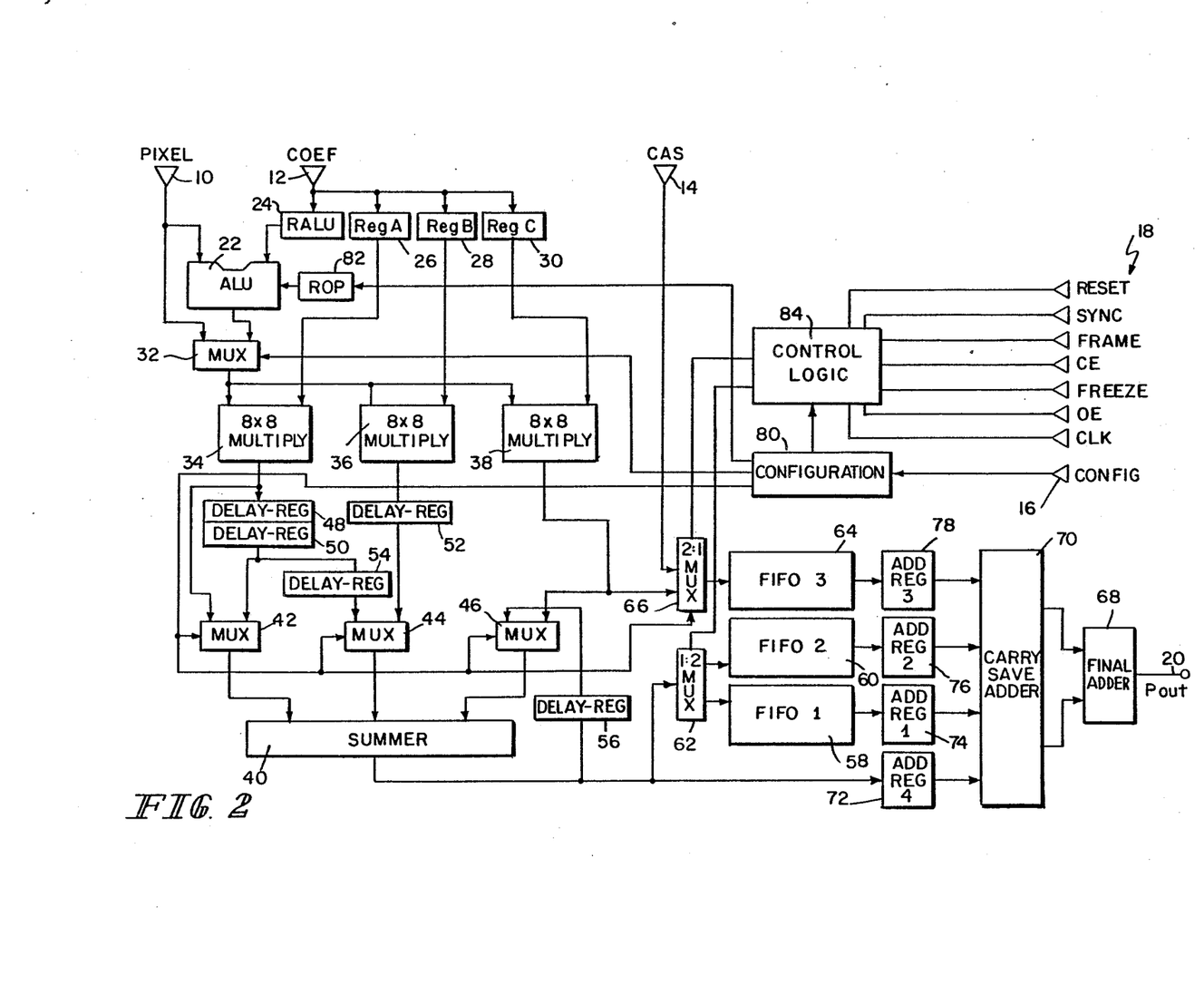
FIG. 2 is a block diagram of a matrix processor module according to the principles of the present invention.

A matrix processor as illustrated in FIG. 2 is known as a fast image processing accelerator (FIPA) and is designed as a solution to real-time image processing. It is capable of performing a 2D spatial convolution on a 512×512 pixel frame array in well under the frame rates required for true real-time processing. It is a unique single chip solution to 3×3 symmetrical kernel convolution and requires no external logic to perform this operation. Moreover, multiple FIPAs can be cascaded to handle asymmetrical kernels with no penalty in speed. The FIPAs unique architecture allows it to receive pixels in the same raster order in which they are scanned, such that no re-sequencing or line buffering of pixels is necessary. This results in a true real-time two-dimensional convolution of the image data. Also included is the capability of all types of pixel-point processing, both single frame and multi frame. The onboard ALU allows pixel-point operation to be performed on the incoming images and the results can be convolved, or passed directly to the outputs.

The FIPA module includes data, word or pixel input bus 10, coefficient input bus 12 and cascade input bus 14. The data word input bus is an eight parallel inputs which receives the image data or pixels to be processed. The coefficient input bus 12 is used to initialize the FIPA by loading the coefficient registers and the ALU register with their respective values. It can also be used as another pixel input bus when dual frame processing is desired. The coefficient is an eight bit bus. The cascade input bus 14 is used during asymmetrical kernel convolution which requires the cascade mode. The 12 bits of the cascade input bus 14 are tied to the output of the preceding stage during asymmetrical convolution and is tied low for symmetrical convolution.

The configuration input bus 16 is an eight bit word used to configure the internal data path for symmetrical or asymmetrical mode, the ALU path or non-ALU path, single frame or dual frame, as well as other possible configurations. Four of these bits may be dedicated the ALU control microcode. The 8 and 12 bit bus widths are quite arbitrary and are dictated mostly by the economics of implementation. The 8 bit and 12 bit widths are only examples of the specific implementation.

The next seven inputs at 18 are for the control logic. They include a freeze, a chip enable CE, output enable OE, frame, reset, sync and clk. The freeze signal freezes internal clocks and disables all processing but allows coefficients to be loaded into the registers. This is used mainly during initiation. The chip enable enables and disables all internal circuitry including registers. When disabled, the chip ignores all input signals and the output tristates regardless of the state of the output enable. Both the output enable and the chip enable must be enabled for the outputs to be driving. The output enable allows the outputs to be tristated even during process of an image. When disabled, the output tristates regardless of the state of the chip enable. Thus, the module can give up bus during processing if the user or host computer desires The frame signal is a new frame clock and is a user supplied input which indicates the beginning of a new image frame. Internally, it will simply act as reset signal to all internal blocks except the coefficient registers. Reset is the main reset and resets all blocks including the coefficient register. Sync is a new row synchronizer and is a user supplied input which indicates the start of a new pixel row. Used internally by the control logic, it is especially useful if row size of less than 512 words is to be processed. The clock input is the main clock input.

The output bus at terminal 20 is P out and represents an 12 bit pixel output bus. This bus contains the processed pixel values of the convolved image. When performing asymmetrical convolution these new values are sent to a cascade input bus of the next FIPA module. This bus may be tristated by either a chip enable or output enable. Additional pins are connected to ground and a supply voltage VCC which are not illustrated.

The data word input 10 is connected to an ALU 22. The coefficient 12 is connected to the ALU register 24 or register A 26 or register B 28 or register C 30. The data word input bus 10 and the output bus of the ALU 22 are connected to multiplexer 32 which provides one of its two input busses as an output bus to three multipliers 34, 36 and 38. The multipliers 34, 36 and 38 multiply the selected inputs with a respective coefficient in registers 26, 28 and 30. The products from the outputs of the multiplier 34, 36 and 38 are summed in summer 40 depending upon the input selected and the configuration determined by respective multiplexers 42, 44 and 46.

The outputs of multiplier 34 are connected directly to one of the inputs of multiplexer 42 and are connected to the other inputs through one cycle delay registers 48 and 50. The outputs of multiplier 36 are connected to the multiplexer 44 through a single delay register 52. The other input to multiplexer 44 is from the outputs of the second delay register 50 through a one cycle delay register 54 and is provided as a negative input to multiplexer 44. Thus in effect the outputs of multiplier 34 are provided after three time delays to the multiplexer 44. The outputs of multiplier 38 are connected directly without time delay to the multiplexer 46. The outputs of the adder 40 are connected through a single cycle time delay register 56 as another input to the multiplexer 46. The interrelationship of the multipliers and the adder will be discussed later with respect to the two configurations for symmetrical and asymmetrical convolution below.

The outputs of summer 40 are selectively connected to FIFO storage 58 and FIFO storage 60 by multiplexer 62. A third FIFO storage 64 receives inputs from the cascade input bus 14 and the outputs of multiplier 38 as selected by multiplexer 66. The capacity of the FIFO 58, 60 and 64 equal that of a single row of a matrix and for the example discussed below it has a 510 eight-bit word capability, but it can be programmed to any depth smaller than the maximum. The output bus of summer 40 of FIFO storage 58, 60 and 64 are connected to final adder 68 by a carry save adder stage 70 and respective add registers 72, 74, 76 and 78.

The configuration byte at input 16 is provided to a configuration register 80 which provides an input to multiplexer 32, 44, 46 and 48 as well as ALU operational register 82. The eight-bit configuration byte loaded via input 16 in configuration register 80 reconfigures the processor's internal data path for this specific type of application. In particular, the configuration byte establishes whether the FIPA module will operate in a stand alone or cascaded mode, whether the convolution will use symmetrical or nonsymmetrical kernel and whether the pixel point operations will be performed on the input data or not. If the FIPA module is to operate only in the pixel-point mode and two images are being operated on simultaneously, the register RALU 24 input path is used for the second pixel input from coefficient input 12, and the coefficient registers RA, RB and RC contain 1, to inhibit any multiplication of the new pixel values obtained at the output of the ALU 22. If any pixel-point operations are to be performed on pixel values before they are convolved, the ALU register RALU 24 is loaded with the desired constant and the ROP register is loaded with ALU opcode. The ALU allows, in addition to the standard set of logical and arithmetic operations, also arithmetic left and right shifts by 2 and by 4 to accommodate "pixel stretching" and "pixel compression" operations. Typically, the ALU is active during such operations as gray scale offsetting/background subtraction or frame averaging and subtraction. All the loading and convolver control are performed by either an internal, or external host processor.

The control logic 84 responds to the inputs 18 and controls the timing and sequencing of the multiplexer 62 to provide the output of summer 40 to be appropriate FIFO 58 and 60 to store on a rotating basis the different rows.

As will be described, the FIPA module is capable of very efficient processing by utilizing its three multiplier channels in parallel fashion. Likewise, the on chip FIFOs allow for storage of two full rows of frame data of 510 words per row so that all sequencing of data is handled internally. Thus, no external logic is necessary to shuffle a pixel or input data before they are sent to the FIPA module for processing.

The first mode to be described is the symmetrical or stand alone kernel convolution mode. For the sake of illustration, the FIPA module of FIG. 2 has been designed for 3×3 matrix operations of kernel convolutions for a 512×512 matrix.

For symmetrical 3×3 convolution kernels, the sequence of computations with the symmetrical coefficient kernel is in the form:

$$\begin{matrix} A & A & A \\ A & E & A \\ A & A & A \end{matrix}$$

where A and E are the symmetrical convolution coefficients.

In order to facilitate the parallel flow of computations, this coefficient kernel will be decomposed into two independent kernels:

$$\begin{matrix} A & A & A \\ A & A & A+0 \\ A & A & A \end{matrix} \begin{matrix} 0 & 0 & 0 \\ E-A & 0= A \\ 0 & 0 & 0 \end{matrix} \begin{matrix} A & A & A \\ E & A \\ A & A & A \end{matrix}$$

resulting in the same value of the final convolution sum.

The specific values of the convolution coefficients A and E depend on the desired function to be performed on the image (such as low or high pass filtration, unipolar or bipolar edge extraction, etc.)

Figure 3:
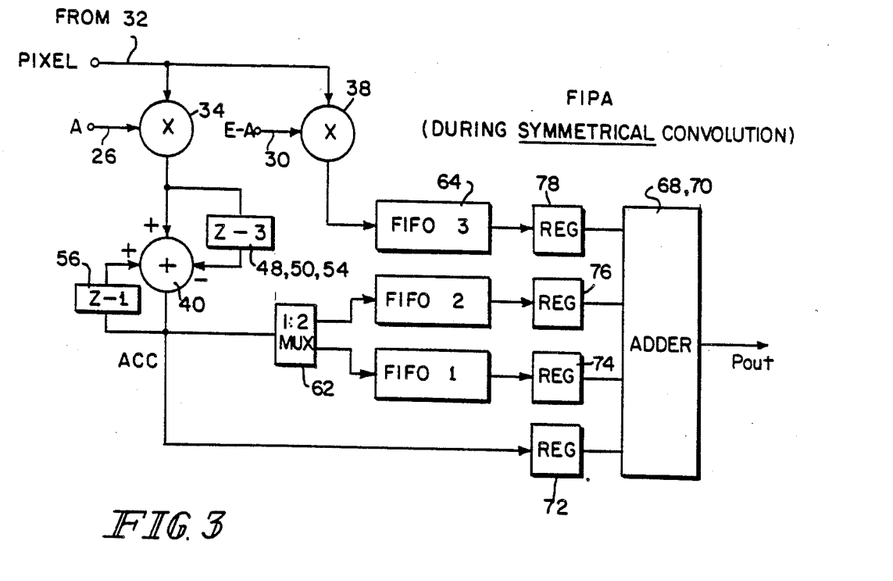
FIG. 3 is a block diagram of the configuration of FIG. 2 for symmetrical convolution.

The symmetrical configuration of FIG. 2 is illustrated in FIG. 3. To perform the symmetrical convolution described above, the register 26 is loaded with the coefficient A while register 30 is loaded with the coefficient difference of E-A. The input data words P are simultaneously inputted to multipliers 34 and 38 where they are multiplied by the coefficient A and the coefficient E-A from registers 26 and 30 respectively. The output of multiplier 38 through multiplexer 66 is inputted to the FIFO 64 to store a row or 510 values of the input P times the coefficient E-A beginning with the second row. The coefficient input 14 is nonselected by the multiplexer 66 since it is not used in the symmetrical mode.

The multiplexers 42, 44 and 46 select their left most input to convert the summer 40 into a three product accumulator. Since it is a 3×3 kernel, three products must be summed for each of the three rows of the kernel. Thus selecting the leftmost input of multiplexers 42, the output of the product of the input P times the coefficient A is fed directly to the summer 40. By connecting leftmost output of multiplexer 46, the output of the summer is applied delayed by one cycle via delay register 56 to the summer 40. This converts the summer 40 into an accumulator, since its output is always fed back, one cycle later to its input. By selecting the left input of multiplexer 46, the product of P times the coefficient A from the multiplier 34 is provided as a two's complement negative number to the summer 40 delayed by three cycles through the delay registers 48, 50 and 54. Thus, for the first cycle, the output of the multiplier 34 is provided to the summer 40. This output is provided to the delay register 56 ($P_1A$). During the second cycle, $P_2A$ from the multiplier 34 is provided to the summer 40 as well as the fed back signal $P_1A$ from delay register 56 such that the total in the summer is $P_1A+P_2A$. On the third cycle this sum is provided back to the summer 40 by delay register 56 while $P_3A$ is provided by the multiplier 34. During the fourth cycle this sum of $P_1A+P_2A+P_3A$ are provided by the delay register 56, the product $P_4A$ is provided by the multiplier 34 while $P_1A$, delayed three cycles, is provided as a negative through multiplexer 44 of the summer 40. Thus, at the fourth cycle, the output of summer 40 is $P_2A+P_3A+P_4A$.

The output for the first row from summer 40 is provided through multiplexer 62 to the FIFO 58. With a new row signified by the sync signal, the output of summer 40 is provided to the FIFO 60. Also during the second row calculation, the output of multiplexer 66 is provided to FIFO 64. Then beginning with the third pixel of the third row, the contents of FIFO 58, 60 and 62 are added with the output of the summer 40 in adder 68, 70 to provide a convoluted output signal Pout. Starting with the 1027 clock cycle, a new pixel value is available each cycle until the entire image has been processed. Thus, if a 40 MHz clock rate is assumed, a 512×512 image can be completely processed in just 6.5 milliseconds or 262,144 cycles with the first new pixel available after only 6.5 microseconds.

When the asymmetrical, non ALU mode is selected for a 512×512 array, the outputs will follow the equation:

$$Pout(n) = A*P(n-2) + B*P(n-1) + C*P(n) + CAS(n-512) \quad (1)$$

where A, B, and C are user defined coefficients and P(n) is a pixel value. If the cascade inputs are tied low, this becomes:

$$Pout(n) = A*P(n-2) + B*P(n-1) + C*P(n) \quad (2)$$

which is the well known FIR filter equation. Thus the FIPA may be used for any application which requires such behavior (such as simple dimensional FIR filtration).

Figure 4:
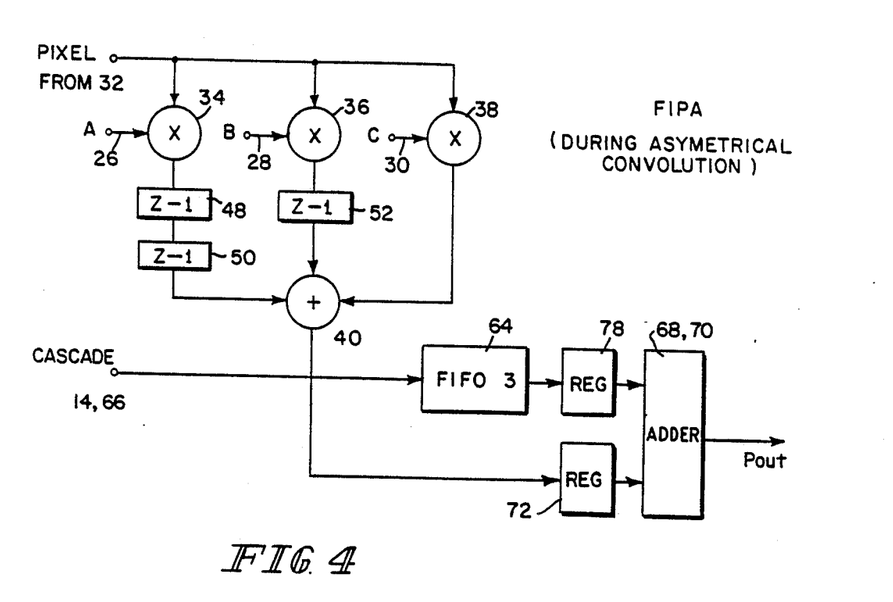
FIG. 4 is a representation of the configuration of the module of FIG. 2 for asymmetrical convolution.
Figure 5:
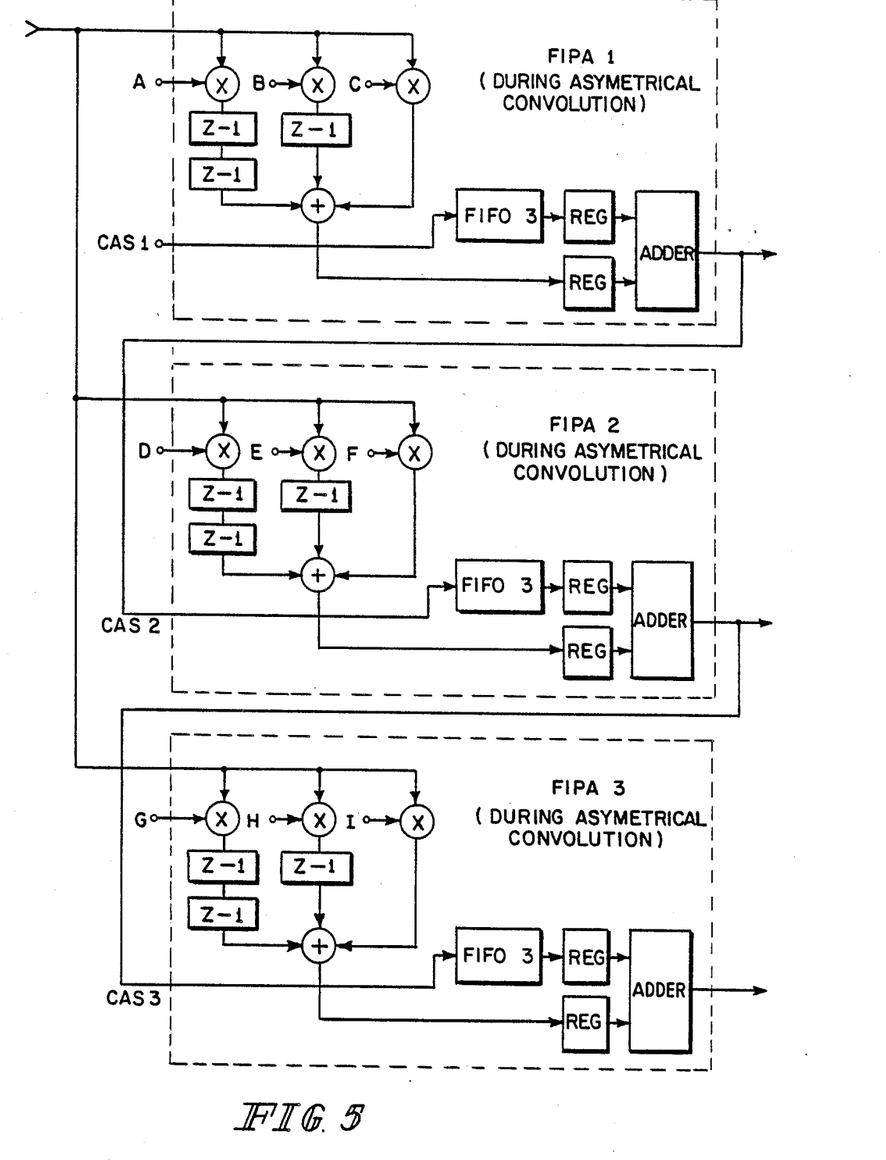
FIG. 5 is a configuration of three modules configured for 3×3 kernel asymmetrical convolution.

FIG. 4 shows a functional block diagram for the FIPA during asymmetrical kernel convolution. For the 3×3 asymmetrical case, it is necessary to cascade 3 FIPAs together as shown in FIG. 5. The 3 coefficient registers of each FIPA must now be loaded with their respective value for the row of the kernel. The coefficient input 12, for the 3 FIPAs may either be tied together and loaded serially, or separated and loaded in parallel. The FREEZE and CE inputs must be used if they are loaded serially.

Once initialized, processing begins with the first row of pixels being processed by FIPA 1 and the results at Pout 1 (equation 1) are stored in FIFO 3 of FIPA 2. During the second row, FIPA 1 is again processing the new pixels and forwarding the results to FIPA 2, while FIPA 2 is also processing the new pixels and adding its results to the old data already stored in its FIFO 3. The results at Pout 2 (equation 1) are forwarded to FIPA 3 and stored in its FIFO 3.

During the third row, FIPA 1 and FIPA 2 continue as above while FIPA 3 processes the new pixels and adds the results to the stored values of its FIFO 3. The results at Pout 3 (equation 1) are the new pixels of the convolved image.

This continues until the entire image has been processed. Thus, the first new (convolved) pixel value becomes available after only 1027 cycles and the entire image is processed in 262,155 cycles, or 6.5 ms, resulting in no speed degradation from the previous case.

To further the explanation of asymmetrical operation, a mathematical description of the FIPAs during this mode is provided.

From equation 1 it follows that:

$$Pout\ 1 = A*P(n-2) + B*P(n-1) + C*P(n) + CAS\ 1(n-512) \quad (3)$$

$$Pout\ 2 = D*P(n-2) + E*P(n-1) + F*P(n) + CAS\ 2(n-512) \quad (4)$$

$$Pout\ 3 = G*P(n-2) + H*P(n-1) + I*P(n) + CAS\ 3(n-512) \quad (5)$$

When the 3 FIPAs are cascaded as in FIG. 5, the following conditions exist:

$$CAS\ 1(n) = 0 \quad (6)$$

$$CAS\ 2(n) = Pout\ 1(n) \quad (7)$$

$$CAS\ 3(n) = Pout\ 2(n) \quad (8)$$

Substituting equations 6, 7 and 8 into equations 3, 4 and 5 and solving for Pout 3, it can be shown that:

$$\begin{aligned}Pout\ 3 =\ & A*P(n-1026) + B*P(n-1025) + C*P(n-1024) + \\& D*P(n-514) + E*P(n-513) + F*P(n-512) \\& G*P(n-2) + H*P(n-1) + I*P(n)\end{aligned} \quad (9)$$

As expected, equation 9 describes a 2-D 3×3 kernel convolution on a 512×512 array of pixels (Pn) with coefficients A through I.

Thus, as can be seen from FIG. 5, there are three multipliers per row provided by three different FIPA modules.

Figure 6:
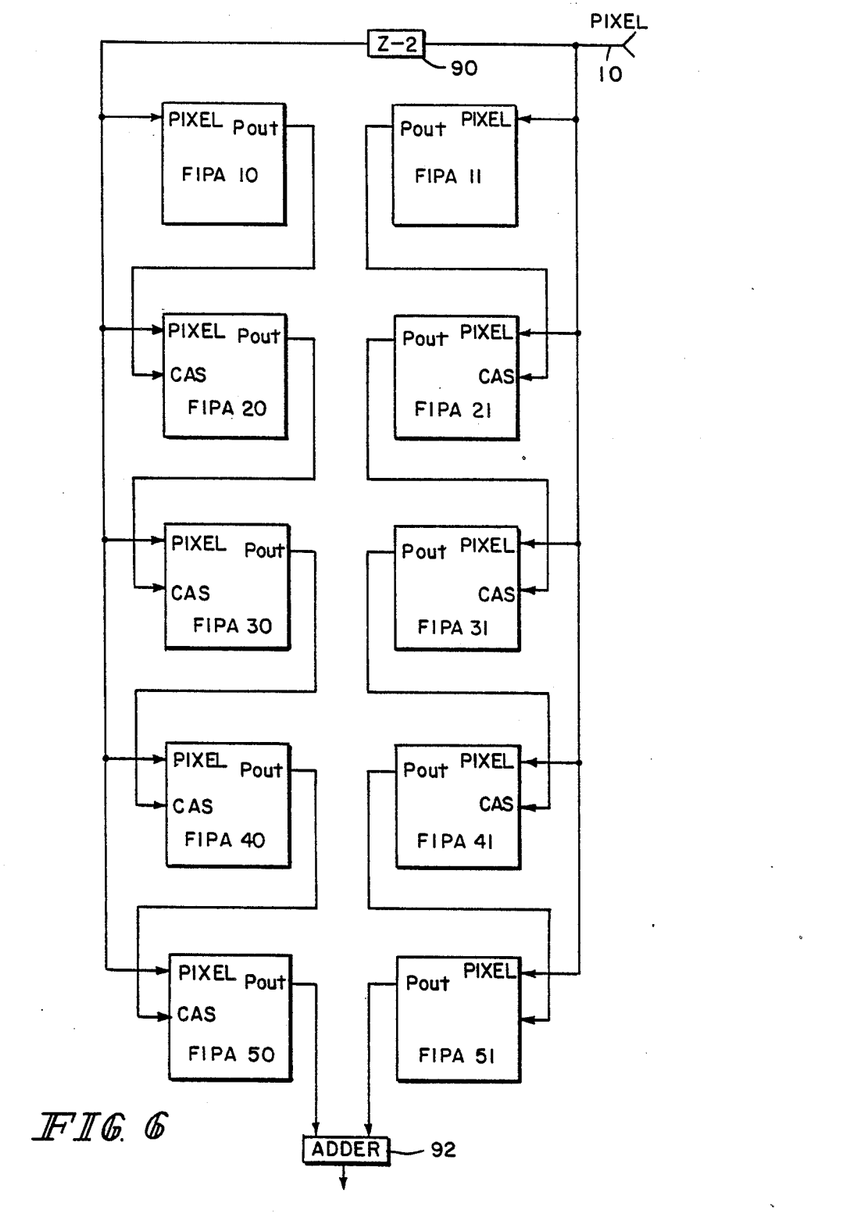
FIG. 6 is a block diagram of the module configuration for a 5×5 kernel convolution using the module of FIG. 2.

The size of the kernel is not limited by the structure of the three multiplier, three FIFO FIPA of FIG. 1. A 5×5 kernel or any other size kernel may be provided using more than one FIPA per row. As illustrated in FIG. 6, a 5×5 kernel convolution shows two FIPAs for each of the five rows. The input 10 is connected in parallel to each of the first FIPAs per row, FIPA 11, FIPA 21, FIPA 31, FIPA 41 and FIPA 51 directly and through a two cycle timed delay 90 to the second FIPO in the rows FIPA 10, FIPA 20, FIPA 30, FIPA 40, and FIPA 50. As in FIG. 5, the output Pout of the FIPA of each row is connected to the cascade input of the subsequent FIPA in its column. Thus, the output of FIPA 11 is connected to the cascade input of FIPA 21, the output of FIPA 21 is connected to the cascade input of FIPA 31, the output of FIPA 41 is connected to the cascade input of FIPA 51. Similarly, the output of FIPA 10 is connected to the cascade input of FIPA 20, the output of FIPA 20 is connected to the cascade input of FIPA 30, the output of FIPA 30 is connected to the cascade input of FIPA 40, and the output of FIPA 40 is connected to the cascade input of FIPA 50. While all three multipliers 34, 36 and 38 with the appropriate time delays are used in FIPOs 11, 21, 31, 41 and 51, only multipliers 34 and 36 with one and two time delays respectively, are used in FIPOs 10, 20, 30, 40 and 50. Coefficient zero is provided to the third multiplier 38 of FIPAs 10, 20, 30, 40 and 50. The output of the last two FIPAs 50 and 51 of each column of the last row are provided to a final output adder 92 to provide a convoluted output. A 7×7 matrix would include three FIPAs per row in three different columns and seven rows.

Figure 7:
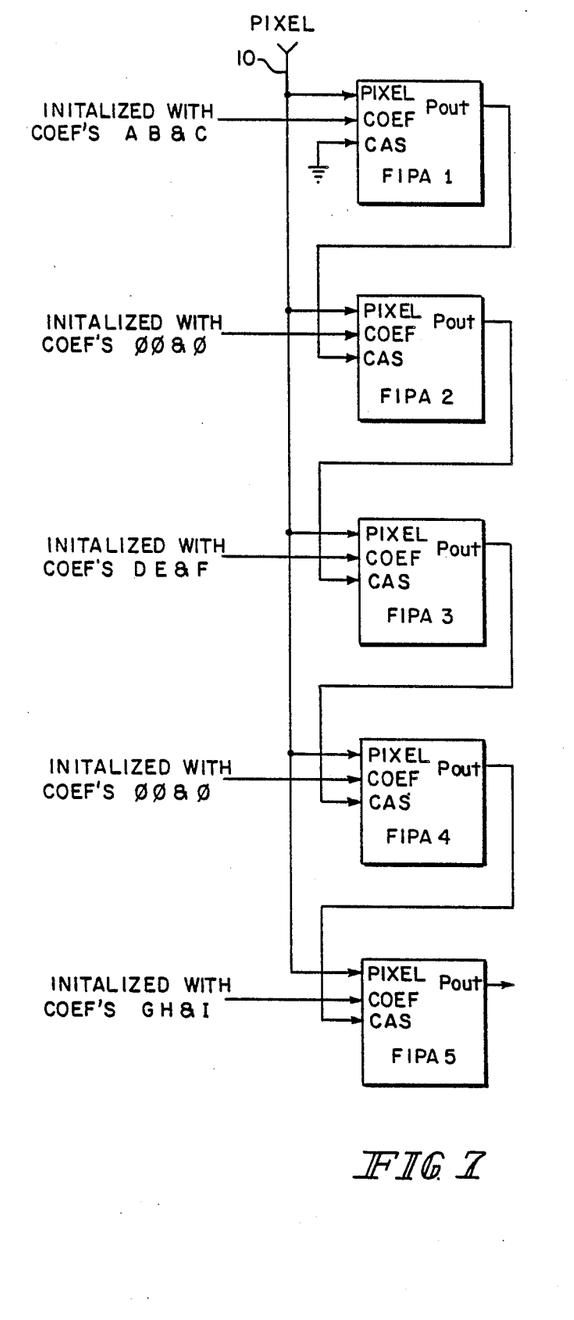
FIG. 7 is a block diagram showing the configurations of the module of FIG. 2 for 3×3 kernel convolutions of a 1024×1024 matrix.

The standard FIPA module or block of FIG. 1 may also be used to operate on 1024×1024 matrix in spite of its FIFOs capacity of 512s, specific to our design. A FIPA with dipper FIFOs can be designed as well. This is achieved by providing an additional FIPA per row except the last row to provide additional storage of the extra 512 words per line without performing multiplication. This is achieved by initializing the coefficients of the extra FIPAs with coefficients of zero. As illustrated in FIG. 7, for a 3×3 kernel convolution of a 1024×1024 matrix include the five FIPAs FIPA 1 through FIPA 5 having inputs connected in parallel to the data word input 10. The coefficients of FIPA 1 is initialized with the coefficients A B C, FIPA 3 is initialized with the coefficients D, E and F and FIPA 5 is initialized with the coefficients G, H and I. FIPAs 2 and 4 are initialized with zero coefficients. The output of FIPA 5 is connected to the cascade input of FIPA 2, the output of FIPA 2 is connected to the cascade input of FIPA 3, the output of FIPA 3 is connected to the cascade input of FIPA 4, and the output of FIPA 4 is connected to the cascade input of FIPA 5. The value of the output Pout 5 is equal to $$\text{Pout 5} = AP(n - 2050) + BP(n - 2049) + CP(n - 2048)$$
$$DP(n - 1026) + EP(n - 1025) + FP(n - 1024)$$
$$GP(n - 2) + HP(n - 1) + IP(n)$$

Thus it can be seen that any matrix can be accommodated which are multiples of the 512 capability of the FIFOs.

Figure 8:
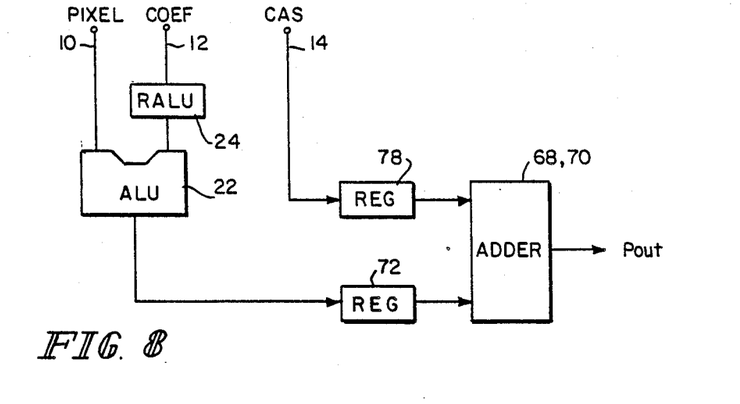
FIG. 8 is a modification of the FIPA of FIG. 2.

A minor modification of the FIPA of FIG. 2 to provide multi-frame operation is illustrated in FIG. 8. The pixels of each frame are provided on the pixel input 10 and the coefficient input 12 and added or subtracted in ALU 22. The output is provided directly to the output adder 68, 70 through register 72. The addition of a third frame would include providing third frame pixels on cascade input 14 which is provided through register 78 to the adder 68, 70. Instead of being connected directly to the output, the output of the ALU 22 can be connected through the multipliers 34, 36 and 38 with different coefficients provided to produce the desired results.

With some minor control/sequence logic modifications the FIPA of FIG. 2 can also be made to perform general purpose 2×2 and 3×3 matrix and vector multiplications, operations very common in 2D and 3D graphics processing. In this instance, RegA 26 should be made transparent to allow for the input of the second matrix coefficients, while the first matrix coefficients are fed to the pixel inputs 10. In this mode of operation three partial products are accumulated similarly to the convolution process, and then fed directly to the outputs. Thus for 3×3 matrix multiplication, the configuration of FIG. 4 without cascaded inputs would be used.

Yet another application area for real-time graphics processing can be easily addressed by the FIPA 2D address transformations. This class of graphics operations involves transformations of old screen buffer addresses to new ones in order to perform shifts, scaling and rotations of graphic objects. These transformations take the form:

$$Y\text{new} = a*Y\text{old} + b*X\text{old} + c$$
$$X\text{new} = d*Y\text{old} + e*X\text{old} + f$$

Figure 9:
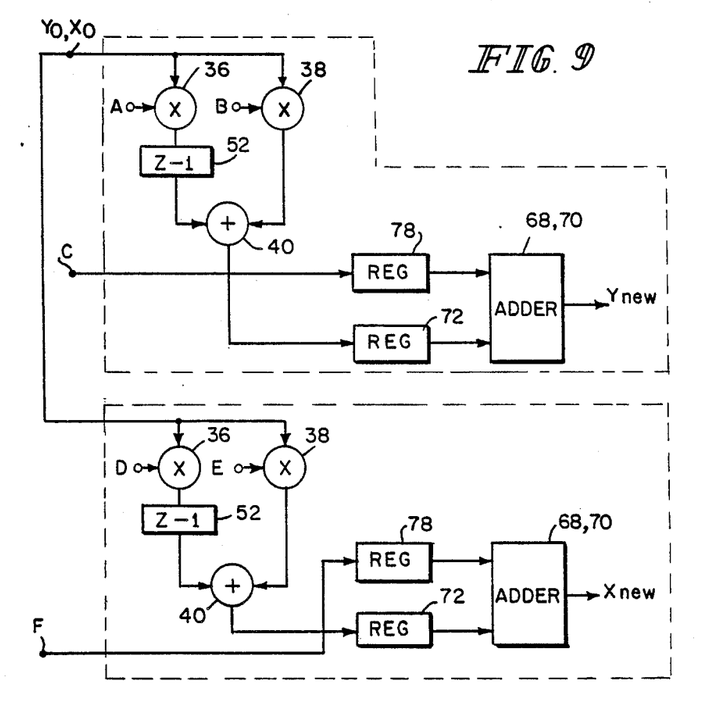
FIG. 9 is a block diagram of two FIPAs of FIG. 1 connected to perform 2d address transformations.

In order to execute this set of transformations, two FIPAs working in parallel would be required—one for each new coordinate. In this configuration registers RegB and RegC would hold the coefficients a and b (or d and e), while coefficients c and f would be fed into the cascade input Cas 14, bypassing FIFO 64 and storing in the register ADD-Reg_78. This mode of operation would require, again, that the RegA be made transparent. The configuration is illustrated in FIG. 9.

Figure 10:
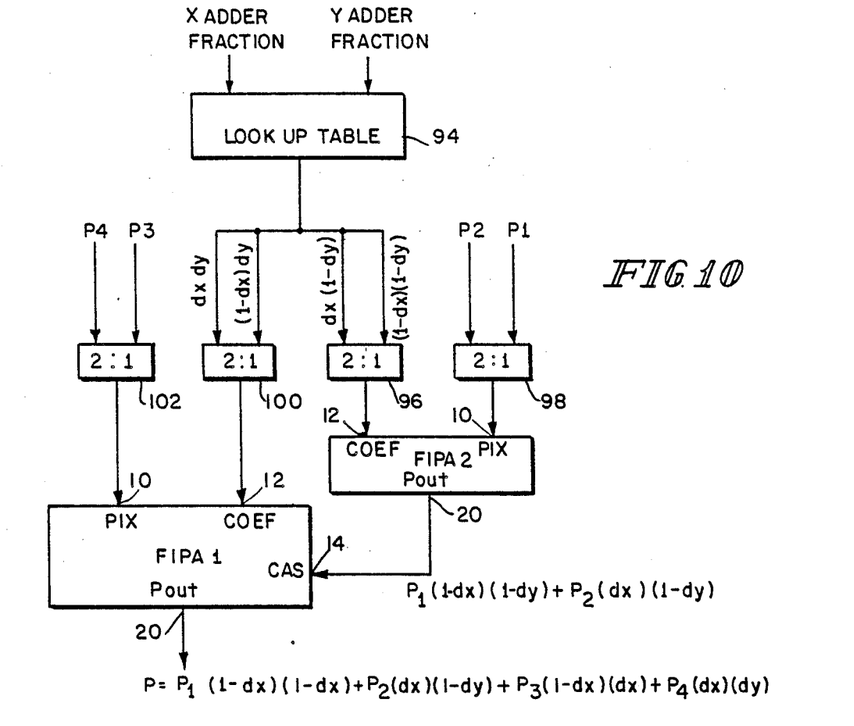
FIGS. 10 and 11 are two different block diagrams using FIPAs of FIG. 1 to perform bilinear interpolation.

Another application area for the modified FIPA architecture is that in the bilinear interpolation mode of operation. Bilinear interpolation is the technique used in image processing to perform linear computations of pixel values not present in the original image. Such computations are required if the original image has been spatially transformed and the old pixel address map no longer corresponds to the new image address space. As illustrated in FIG. 10, two FIPAs working in parallel can easily perform a set of bilinear interpolation on four pixels, each performing a sequence of two interpolations, at the rate of 20 MHz which is more than sufficient for real time image transformations.

Figure 11:
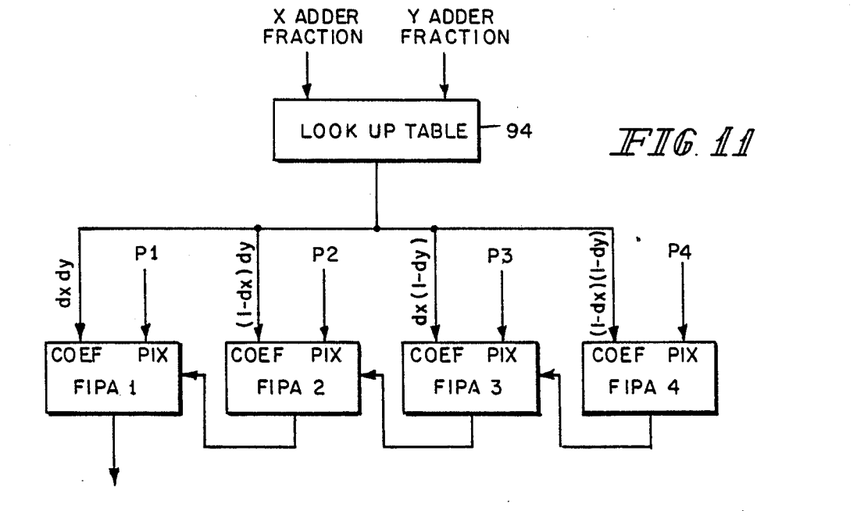

A Look Up Table 94 receives the X adder fraction and the Y adder fraction which are used as addresses to derive four weights required for the parallel interpolation. Two of the weights, namely (1-dx)(1-dy) and dx(1-dy) are provided to FIFO 2 at coefficient input 12 via multiplexer 96 whereas they are multiplied by the pixel points P1 and P2 provided to FIFO 2 at its pixel input 10 via multiplexer 98. The output 20 of FIFO 2 is equal to P1 (1-dx) (1-dy)+P2 (dx) (1-dy). The third and fourth coefficient (1-dx) dy and dx dy are provided to the coefficient input 12 of FIFO 1 via multiplexer 100 to be multiplied therein by pixel points P3 and P4 provided to the pixel input 10 via multiplexer 102. The output Pout on terminal 20 of FIFO 1 is equal to P1(1-dx)(1-dy)+P2(dx)(1-dy)+P3(1-dx)(dy)+P4(dx)(dy). If even higher speed is required four FIPAs can be made to work in parallel to perform such function at the rate of 40 MHz as illustrated in FIG. 11.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for Q×R kernel convolution of an M×N array of words P comprising:
    input means for receiving, in sequence, words P from said M×N array;
    coefficient means for storing coefficients $C_1$ and $C_2$;
    first multiplying means connected to said input means and said coefficient means for producing a product $PC_1$ for all M times N words P;
    second multiplying means connected to said input means and said coefficient means for producing a plurality of products $P(C_2-C_1)$;
    summing means connected to said first multiplying means for providing a plurality of sums S equal to $P_iC_1+P_{i-1}C_1, \ldots +P_{i-Q+1}C_1$ for each of the N rows for i from Q to M per row;
    R-1 FIFO storage means each connected to said summing means and having a capacity of M for storing said plurality of sums S for a respective row for rows 1 to R-1;
    an $R^{th}$ FIFO storage means connected to said second multiplying means and having a capacity of M for storing said plurality of products $P(C_2-C_1)$; and
    adder means connected to said summing means, said R-1 FIFO storage means and said FIFO storage means for adding sums S from said summing means and said R-1 FIFO storage means and products from said $R^{th}$ FIFO storage means to provide an output convolution $P_c$.

2. A system according to claim 1, wherein said summing means includes:
    accumulator means having three inputs for adding signals and providing accumulated results at its outputs;

first delay means for connecting the output of said accumulator means to one input of said accumulator means delayed by one cycle;

means for connecting said first multiplying means to another input of said accumulating means; and second delay means for connecting said first multiplying means to another input of said accumulator means as a negative and delayed by Q cycles.

3. A system according to claim 1, including multiplex means connected between said summing means and said R-1 FIFO storage means for storing a plurality of sums of a respective row in a respective FIFO storage means.

4. A system according to claim 1, including ALU means connected between said input means and said first and second multiplying means for performing arithmetic and logical operations on said words P before being inputted to said first and second multiplying means.

5. A system according to claim 1, wherein said second multiplying means produces said plurality of products $P(C_2-C_1)$ for at least the $(Q+1)/2$ to the $M-(Q-1)/2$ words P per row in at least rows $(R+1)/2$ to $N-(R-1)/2$.

6. A system for $Q \times R$ kernel convolution of an $M \times N$ array of words P comprising:

input means for receiving, in sequence, words P from said $M \times N$ array;

$Q \times R$ coefficient means for storing coefficients $C_1$ through QC per row;

$Q \times R$ multiplying means each connected to said input and a respective coefficient means for producing a product $PC_j$ for j from 1 to Q per row;

R summing means having Q inputs connected to a respective group of Q multiplying means for providing a plurality of sums S of Q products where $S = P_i C_q + P_{i-1} C_{q-1} \ldots + P_{i-Q+1} C_1$ for each of the N rows for i from q to M per row;

R-1 FIFO storage means each connected to a respective summing means, except the $R^{th}$ summing means, and having a capacity of M for storing said plurality of sums S for a respective row; and adder means connected to said R-1 FIFO storage means and said $R^{th}$ summing means for adding said sums to provide an output convolution $P_c$.

7. A system according to claim 6, wherein each of said summing means includes at each input a delay means for delaying the product $PC_j$ from a respective multiplying means by j-1 cycles.

8. A system according to claim 6, wherein said adder means includes R-1 adders connected to a respective FIFO storage means and a respective summing means, except a first summing means, for adding a sum S from previous row with a sum from it's row to Produce a summed output.

9. A system according to claim 6, including an ALU means connected between said input means and said multiplying means for performing arithmetical and logical operations on said words P before being inputted to said multiplying means.

10. A system according to claim 6, wherein said system includes FIPA means each including Q coefficient means for storing coefficients $C_1$ through $C_Q$ for its row;

Q multiplying means each connected to said input means and a respective coefficient means for producing a product $PC_j$;

summing means connected to said Q multiplying means for providing said plurality of sums S;

FIFO storage means connected to an output of a previous FIPA for storing M outputs from said previous FIPA; and adder means connected to said summing means and said FIFO means for adding said sums S to a sum S from said FIFO means and provide a FIPA output; said output of said $R^{th}$ FIPA is said output convolution $P_c$.

11. A system according to claim 10, wherein each of said summing means includes at each input a delay means for delaying the product $PC_j$ from a respective multiplying means by j-1 cycles.

12. A system according to claim 10, including an ALU means connected between said input means and said multiplying means for performing arithmetical and logical operations on said words P before being inputted to said multiplying means.

13. A system according to claim 6, wherein said system includes M (R-1)+1 FIPA means, where M is an integer, each including:

Q coefficient means for storing coefficients $C_1$ through $C_q$ for its row;

Q multiplying means each connected to said input means and a respective coefficient means for producing a product $PC_j$;

summing means connected to said Q multiplying means for providing said plurality of sums S;

FIFO storage means connected to an output of a previous FIPA for storing M/m outputs from a previous FIPA; and adder means connected to said summing means and said FIFO means for adding said sums S to a sum S from said FIFO means and provide a FIPA output; said output of said $R^{th}$ FIPA is said output convolution $P_c$; and wherein said coefficient of said coefficient means other than the 1+km FIPAs, wherein k is from 0 to R-1, are set to zero.

14. A system according to claim 6, wherein said system includes R rows of FIPA means and Q/q FIPA means per row in Q/q columns, each FIPA means includes q coefficient means for storing coefficients C to $C_q$ for its row, extra coefficient means being set to zero;

q multiplying means each connected to said input means and a respective coefficient means for producing a product $PC_j$;

summing means connected to said q multiplying means for providing a plurality of sums S;

FIFO storage means connected to an output of a FIPA from a previous row in its column for storing M outputs from said previous FIPA;

adder means connected to said summing means and said FIFO means for adding said sums S to a sum S from FIFO means and provide a FIPA output; and wherein said system includes a final adder means connected to the $R^{th}$ FIPA in each column for adding their outputs to provide said output convolution $P_c$.

15. A system according to claim 14, wherein each of said summing means includes at each input a delay means for delaying the product $PC_j$ from a respective multiplying means by j-1 cycles.

16. A system according to claim 14, including an ALU means connected between said input means and said multiplying means for performing arithmetical and logical operations on said words P before being inputted to said multiplying means.

17. A matrix processor for a matrix of M×N comprising:
- a data input means for receiving, in sequence, words P from a matrix;
- coefficient input means for receiving coefficients $C_1$ to $C_Q$;
- cascade input means for receiving summing data;
- Q multiplying means connected to said data input means and said coefficient input means for producing a product $PC_j$ for j from 1 to Q;
- Q first multiplexing means having a first input connected to a respective multiplying means by a time delay means having a delay of j-1 cycles and a second input;
- said $Q^{th}$ multiplying means also being connected directly to said second input of said $Q^{th}$ first multiplexing means by a time delay means having a delay of Q cycles;
- summing means connected to said first multiplexing means for providing a sum S;
- time delay means having a delay of one cycle connecting the summing means to the second input of said first multiplexing means;
- R-1 FIFO storage means selectively connected to said summing means by a second multiplexing means and having a capacity of M for storing a plurality of sums S for a row of said matrix;
- an $R^{th}$ FIFO storage means selectively connected to said cascade input means and said first multiplying means by a third multiplexing means and having a capacity of M for storing summing data or product;
- adder means connected to said summing means and said FIFO storage means for adding inputs from said summing means and said FIFO means to provide an output $P_c$; and
- control means for controlling said multiplexing means to determine a configuration of said matrix processor.

18. A matrix processor according to claim 17, including ALU means connected between said data input means and said multiplying means and controlled by said control means for performing selective arithmetical and logical operations on said words P before being inputted to said multiplying means.

19. A matrix processor according to claim 18, including fourth multiplexing means, under the control of said control means, having an input connected to said data input means, an input connected to said ALU means, and an output connected to said multiplying means.

20. A matrix processor according to claim 17, wherein said control means, for symmetrical kernel convolution selection, includes (a) means for selecting the second input as the output of said first multiplexing means, (b) means for sequencing sums S from said summing means to a respective R-1 FIFO storage means for a respective row via said second multiplexing means, and (c) means for selecting the first multiplexing input as the output of said third multiplying means.

21. A matrix processor according to claim 20, wherein said coefficient input means includes a coefficient $C_Q$ for the $Q^{th}$ multiplying means and a coefficient of $C_1-C_Q$, for the first multiplying means.

22. A matrix processor according to claim 17, wherein said control means, for asymmetrical kernel convolution selection, includes (a) means for selecting the first input for the output of said first multiplexing means, (b) means for selecting no input for the output of said second multiplexing means and (c) means for selecting said cascade input means as the output of said third multiplexing means.

23. A matrix processor according to claim 22, including a plurality of said matrix processors, one per row of a kernel and having its cascade input means connected to the output of a receding rows adder means' output, their data input means being connected in parallel and said coefficient input means receiving row specific coefficients.

24. A matrix processor according to claim 23, wherein each row includes a plurality m of said matrix processors, except the last row, each matrix processor's FIFO storage means has a capacity of M/m, the coefficient input means of the first matrix processor of each row receive row coefficients and all others receive zero coefficients, all processors have their data inputs connected in parallel and their cascade input means connected to the output of a preceding adder means in a respective row.

25. A matrix processor according to claim 23, wherein each row includes a plurality Q/q of said matrix processors in Q/q columns, data input means of said matrix processors being connected in parallel and their cascade input means being connected to the output of a preceding adder means in a respective column; and
- including a final adder means connected to the output of the adder of the last matrix processor of each column to provide said output convolution $P_c$.

26. A matrix processor module for Q×R matrix operations comprising:
- a data input means for receiving, in sequence, words P from a matrix;
- coefficient input means for receiving coefficients $C_1$ to $C_Q$;
- cascade input means for receiving summing data;
- Q multiplying means for connecting to said data input means and said coefficient input means for producing a product $PC_j$ for j from 1 to Q;
- summing means selectively connected to said multiplying means by selected delay means for providing sums S of its inputs;
- a plurality of FIFO storage means selectively connected to said summing means, said cascade input means and a multiplying means, for storing M words;
- adder means connected to said summing means and said FIFO storage means for adding inputs from said summing means and said FIFO means to provide an output $P_c$; and
- control means connected to said summing means and said FIFO storage means for controlling the configuration of said module to (a) first configuration wherein said summing means is a shifting accumulator of Q products $P_iC_1 + P_{i-1}C_1 \ldots + P_{i-Q+1}C_1$, R-1 FIFO means store respective rows of sums S and an $R^{th}$ FIFO stores the product $P_i(C_2-C_1)$ and (b) second configuration wherein said summing means sums Q products $P_iC_1$, $P_{i+1}C_2$, $\ldots P_{i-Q+1}C_q$, a FIFO storage means stores data from said cascade input means from a preceding module, and said adder means adds said output of said summing means and of said FIFO storage means storing cascade data.

* * * * *